US006333810B1

United States Patent
Yoon et al.

(10) Patent No.: US 6,333,810 B1
(45) Date of Patent: Dec. 25, 2001

(54) TWO-STAGE ERBIUM DOPED FIBER AMPLIFIER USING REMNANT PUMPING LIGHT

(75) Inventors: Ju-in Yoon; Hyun-soon Lee, both of Taegu (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/347,402

(22) Filed: Jul. 6, 1999

(30) Foreign Application Priority Data

Jul. 3, 1998 (KR) .................................................. 98-26833

(51) Int. Cl.[7] .................................................... H01S 03/00
(52) U.S. Cl. ............................................................ 359/341.32
(58) Field of Search ....................................... 354/341, 337, 354/341.32

(56) References Cited

U.S. PATENT DOCUMENTS

| 5,506,723 | * | 4/1996 | Junginger | 359/341 |
| 5,673,129 | | 9/1997 | Mizrahi | 359/124 |
| 5,703,711 | * | 12/1997 | Hamada | 359/341 |
| 5,768,012 | | 6/1998 | Zanoni et al. | 359/341 |
| 5,808,786 | * | 9/1998 | Shibuya | 359/341 |

FOREIGN PATENT DOCUMENTS 98-059190   10/1998   (KR) .

* cited by examiner

*Primary Examiner*—Mark Hellner
(74) *Attorney, Agent, or Firm*—Robert E. Bushnell, Esq.

(57) ABSTRACT

A two-stage erbium doped fiber amplifier (EDFA) using remnant pumping light is provided. The two-stage erbium doped fiber amplifier (EDFA) using remnant pumping light includes a first erbium doped fiber amplifying unit for multiplexing remnant pumping light received from a rear-stage and received optical signal, wherein the input optical signal is amplified by the remnant pumping light and a second erbium doped fiber amplifying unit which receives pumping light generated by a pumping source and optical signal output from the first erbium doped fiber amplifying unit, multiplexes the same, amplifies the optical signal output from the first erbium doped fiber amplifying unit, and outputs the remnant pumping light to the first erbium doped fiber amplifying unit.

19 Claims, 5 Drawing Sheets

TWO-STAGE ERBIUM DOPED FIBER AMPLIFIER USING REMNANT PUMPING LIGHT

CLAIM OF PRIORITY

This application makes reference to, incorporates the same herein, and claims all benefits accruing under 35 U.S.C §119 from an application entitled Two-Stage Erbium Doped Fiber Amplifier Using Remnant Pumping Light earlier filed in the Korean Industrial Property Office on Jul. 3, 1998, and there duly assigned Ser. No. 98-26833 by that Office.

BACKGROUND OF THE INVENTION

1. Field of the Invention

The present invention relates to a two-stage erbium doped fiber amplifier (EDFA) using remnant pumping light, and more particularly, to a two-stage EDFA wherein a front-stage EDFA is excited using remnant pumping light after a rear-stage EDFA is excited, thereby amplifying signal light.

2. Description of the Related Art

In an optical transmission system, an erbium doped fiber amplifier(EDFA) directly amplifies an optical signal that has been weakened during transmission without converting the optical signal into an electrical signal, thus remarkably extending the transmission distance. U.S. Pat. No. 5,768,012 to Raymond Zanoni et al. entitled Apparatus And Method For The High-Power Pumping Of Fiber Optic Amplifiers and U.S. Pat. No. 5,673,129 to Victor Mizrahi entitled WDM Optical Communication Systems With Wavelength Stabilized Optical Selectors are examples of known optical amplifiers.

FIG. 1 shows a structure in which a optical signal is amplified by the above-mentioned two-stage EDFA. The EDFA shown in FIG. 1 includes an input connector 100, a first divider 110, a first photodiode 120, a controller 130, a first pumping source 140, a first erbium doped fiber amplifying unit 150, a second pumping source 160, a second erbium doped fiber amplifying unit 170, a second divider 180, a second photodiode 190, and an output connector 195.

The operation of the EDFA is as follows. When optical signal is input through the input connector 100, the first divider 110 divides the optical signal according to a predetermined ratio. The first photodiode 120 converts the divided optical signal from the first divider 110 into an electrical signal and outputs the electrical signal to the controller 130. First pumping light generated by the first pumping source 140 is multiplexed with optical signal in the first erbium doped fiber amplifying unit 150. In this way, the first erbium doped fiber amplifying unit 150 amplifies the optical signal in response to the first pumping light. Second pumping light generated by the second pumping source 160 is multiplexed with optical signal amplified by the first erbium doped fiber amplifying unit 150. In this way, the second erbium doped fiber amplifying unit 170 re-amplifies the amplified optical signal in response to the second pumping light. The second divider 180 divides optical signal that has been re-amplified by the second erbium doped fiber amplifying unit 170 according to a predetermined ratio. The second photodiode 190 converts the divided optical signal into an electrical signal and outputs the electrical signal to the controller 130. The controller 130 controls the amplification factor of the first and second optical fiber amplifiers 150 and 170 by checking the intensity of optical signal from the electrical signal output from the first and second photodiodes 120 and 190 and controlling the intensity of pumping light of the first and second pumping sources 140 and 160.

Since two pumping sources are used in such a two-stage EDFA, the efficiency of the pumping light is low.

SUMMARY OF THE INVENTION

To solve the above problem, it is an objective of the present invention to provide a two-stage EDFA using remnant pumping, light from the rear stage EDFA for amplifying the optical signal by a front-stage EDFA, and using a pumping light from a pumping sourse to amplify the output optical signal from the front-stage EDFA.

Accordingly, to achieve the above objective, there is provided a two-stage erbium doped fiber amplifier (EDFA) using remnant pumping light, comprising a first erbium doped fiber amplifying unit for multiplexing remnant pumping light received from a rear-stage and a received optical signal, wherein the optical signal is amplified by the remnant pumping light, and a second erbium doped fiber amplifying unit which receives pumping light generated by a pumping source and the amplified optical signal output from the first erbium doped fiber amplifying unit, multiplexes the pumping light and the amplified optical signal, amplifies the amplified optical signal output from the first erbium doped fiber amplifying unit in response to the pumping light via a demultiplexer, and outputs the remnant pumping light to the first erbium doped fiber amplifying unit.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
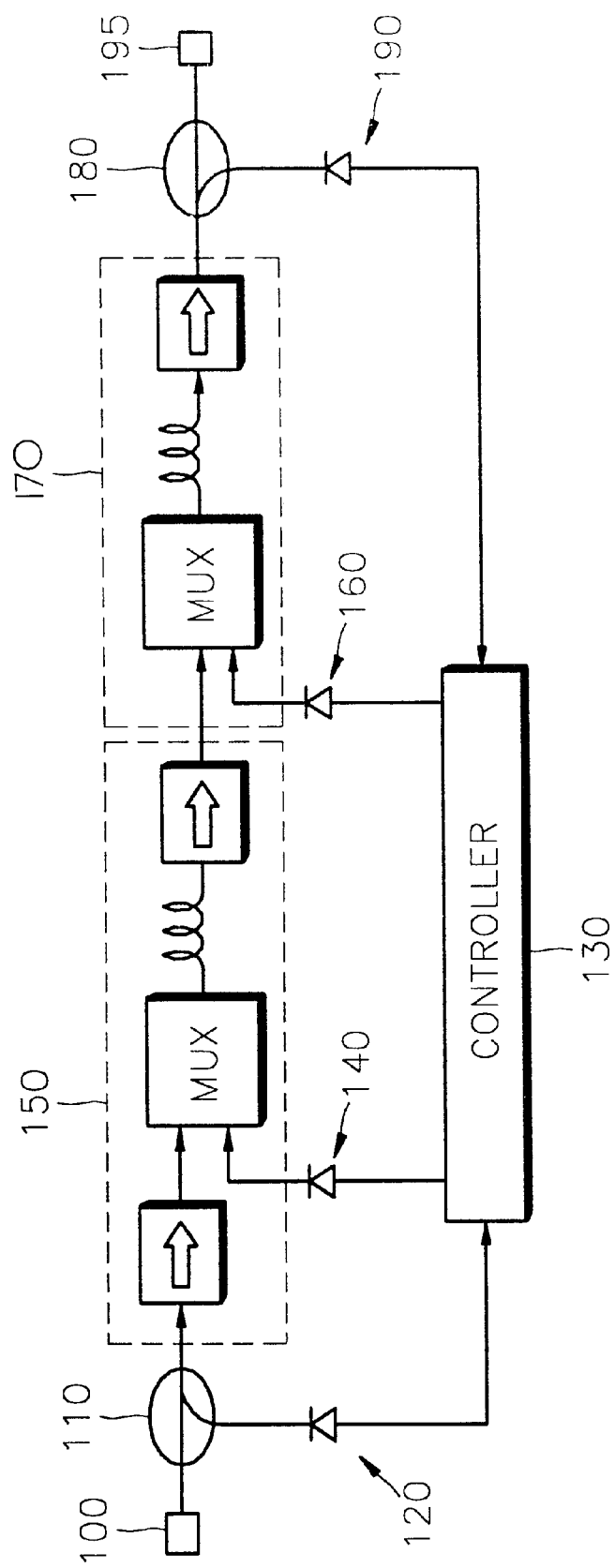
FIG. 1 shows the structure of a conventional two-stage EDFA.
Figure 2A:
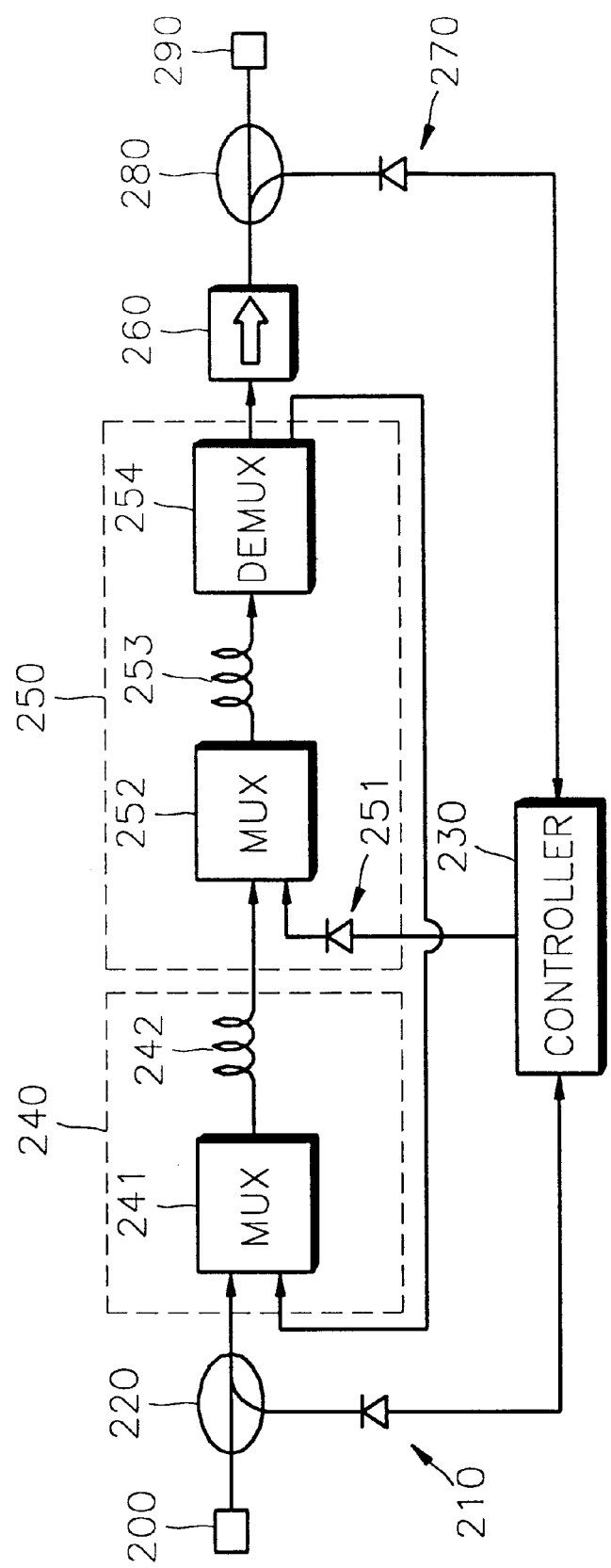
FIG. 2A shows the structure of a two-stage EDFA using remnant pumping light according to the present invention.

Hereinafter, embodiments of the present invention will be described in more detail with reference to the attached drawings. FIG. 2A shows the structure of a two-stage EDFA using remnant pumping light according to the present invention. The EDFA of FIG. 2A includes an input connector 200, a first photodiode 210, a first divider 220, a controller 230, a first erbium doped fiber amplifying unit 240, a second erbium doped fiber amplifying unit 250, an isolator 260, a second photodiode 270, a second divider 280, and an output connector 290. The first erbium doped fiber amplifying unit 240 includes a first wavelength division multiplexer (MUX) 241 and a first erbium doped fiber (EDF) 242. The second erbium doped fiber amplifying unit 250 includes a pumping source 251, a second MUX 252, a second EDF 253, and a wavelength division demultiplexer (DEMUX) 254.

The operation of the above embodiment in which the optical signal is amplified in the first EDF 242 using remnant pumping light after amplifying optical signal in the second EDF 253, will now be described. The pumping source 251 generates pumping light having appropriate intensity at a wavelength of 800 nm, 980 nm, or 1480 nm according to the desired characteristics of the EDFA. In the present invention, the pumping light having the wavelength of 980 nm or 1480 nm is generated. The second MUX 252 multiplexes pumping light generated by pumping source 251 with the optical signal received from the first EDF 242. The multiplexed pumping light excites the erbium ions of the second EDF 253 to amplify the optical signal. The first and second EDFs 242 and 253 are each optical fibers doped with erbium, a rare earth metal. Since EDFs have a bandwidth of about 60 nm at specific wavelengths such as 800 nm, 980 nm, and 1480 nm and have a diverging spectrum, an EDF can amplify the received optical signal having wavelengths of up to about the 1550 nm band. Amplification occurs in an EDF by the stimulated emission of excited erbium when pumping light excites erbium ions in a ground state. In this way, the second EDF 253 amplifies the optical signal in response to pumping light from the pumping, source 251. The DEMUX 254 separates amplified optical signal from the remnant pumping light. Separated remnant pumping light is then supplied to the first MUX 241.

Separated remnant pumping light is supplied to the first EDF 242 through the first MUX 241, thus exciting the erbium ions of the first EDF 242. The optical signal received through the input connector 200 is divided by the first divider 220 in a predetermined ratio such that a part thereof is output to the first photodiode 210. The first photodiode 210 converts the divided part of the optical signal into an electrical signal and outputs the electrical signal to the controller 230. The first MUX 241 multiplexes the optical signal received through the first divider 220 with the remnant pumping light supplied from the DEMUX 254. The first EDF 242 amplifies the optical signal by the stimulated emission of the excited erbium ions. The second divider 280 divides the optical signal amplified by the second EDF 253 in a predetermined ratio such that a part thereof is output to the second photodiode 270. The second photodiode 270 converts the divided part of the optical signal into an electrical signal and outputs the electrical signal to the controller 230. The secondly amplified optical signal divided by the second divider 280 is output to the output connector 290. The controller 230 checks the output values of the first and second photo diodes 210 and 270. These values indicate the intensities of the input optical signal from the input connector 200 and output optical signal to the output connector 270. According to the checked results, the controller 230 controls the amplification factor in the first and second EDFs 242 and 253 by controlling the intensity of the pumping light output from the pumping source 251. The isolator 260 prevents amplified spontaneous emission (ASE) generated by the first and second EDFs 242 and 253 from being reflected from the output connector 290 towards the EDFS 242 and 253.

Figure 2B:
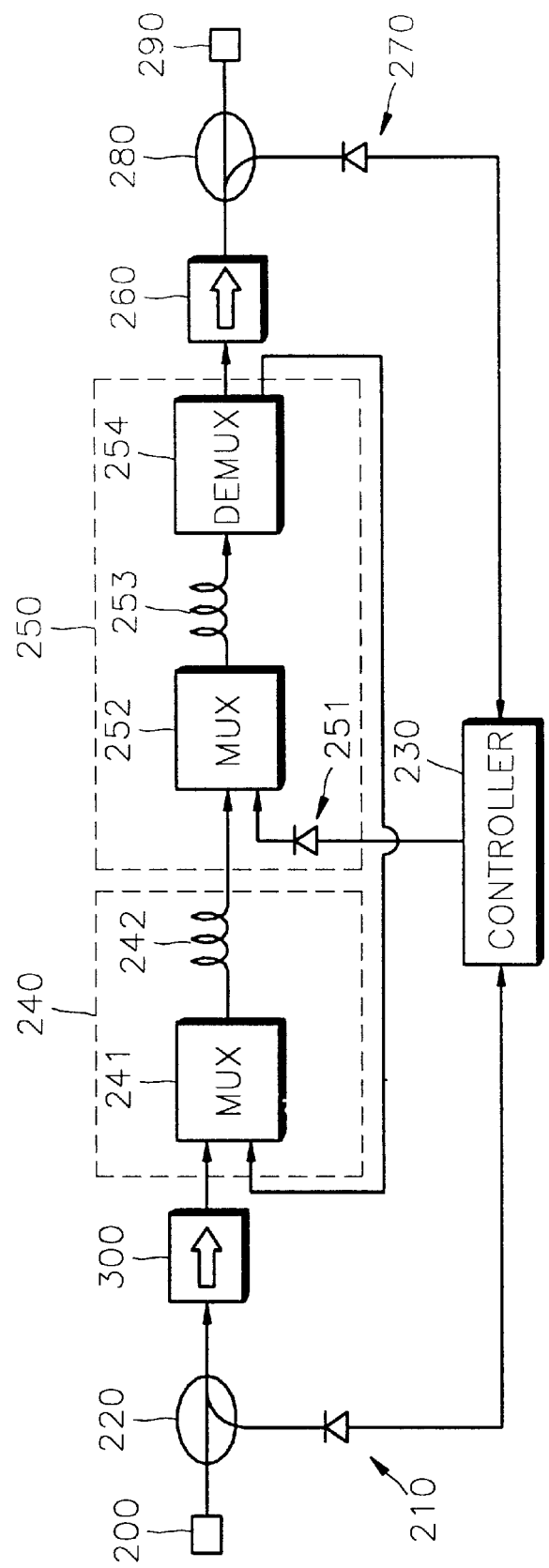
FIG. 2B is another embodiment of FIG. 2A.

FIG. 2B is another embodiment of the present invention. The structure and operation of the EDFA shown in FIG. 2B are different from those of the EDFA shown in FIG. 2A only in that an isolator 300 is further included between the first divider 220 and the first erbium doped fiber amplifying unit 240. The isolator 300 prevents ASE generated by the first and second EDFs 242 and 253 from being reflected from the EDFs 242 and 253 back to the input connector 200.

Figure 2C:
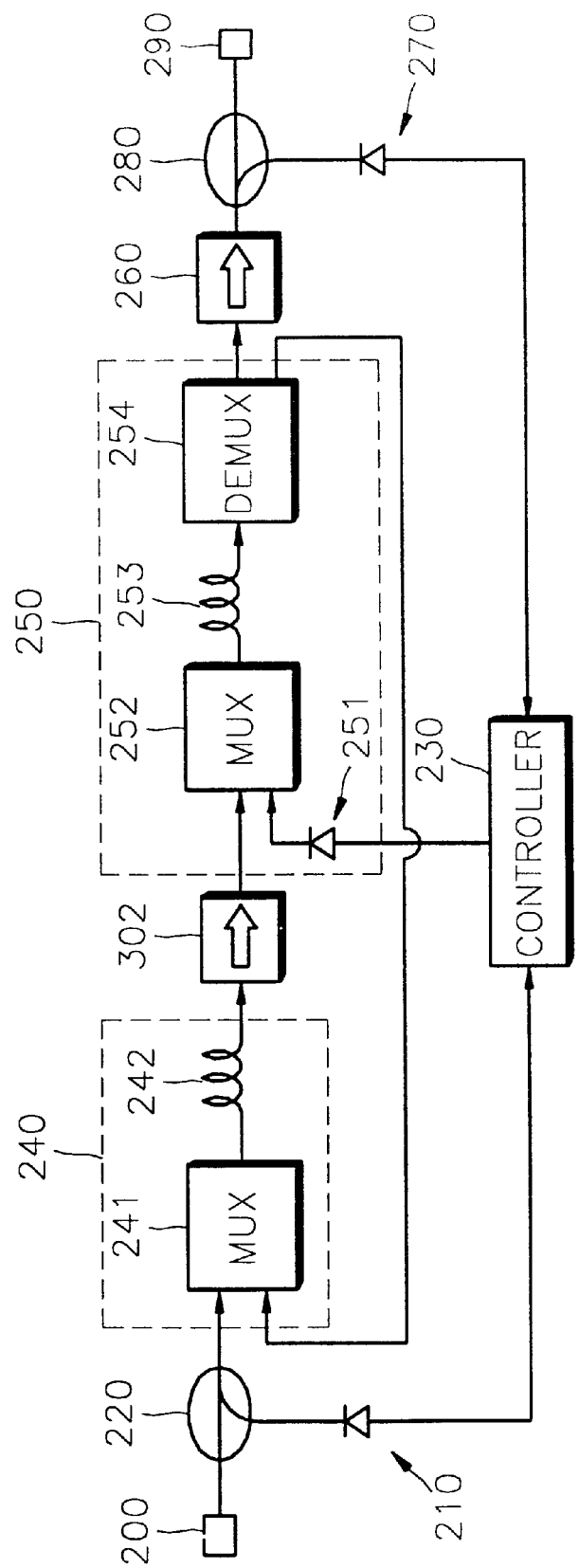
FIG. 2C is still another embodiment of FIG. 2A.

FIG. 2C illustrates still another embodiment of the present invention. The structure and operation of the EDFA shown in FIG. 2C are different from those of the EDFA shown in FIG. 2A only in that an isolator 302 is further included between the first erbium doped fiber amplifying unit 240 and the second erbium doped fiber amplifying unit 250. The isolator 302 prevents ASE generated by the second EDF 253 from going toward the EDF 242 and affecting the amplification of the first EDF 242.

Figure 2D:
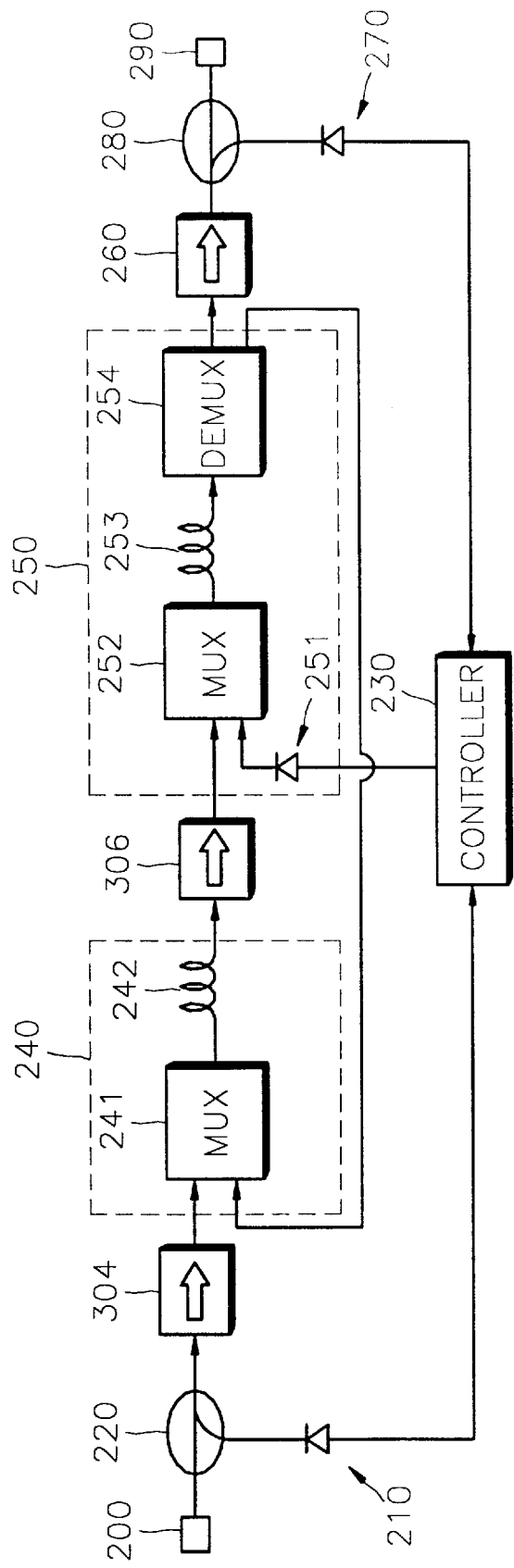
FIG. 2D is yet another embodiment of FIG. 2A.

FIG. 2D illustrates yet another embodiment of the present invention. The structure and operation of the EDFA shown in FIG. 2D are different from those of the EDFA shown in FIG. 2A only in that an isolator 304 is further included between the first divider 220 and the first erbium doped fiber amplifying unit 240 and another isolator 306 is further included between the first erbium doped fiber amplifying unit 240 and the second erbium doped fiber amplifying unit 250. The 304 prevents ASE generated by the first EDF 242 from being reflected back towards the input connector 200. The isolator 306 prevents ASE generated by the second EDF 253 from going toward the EDF 242 and affecting the amplification of the first EDF 242.

In the present embodiments, the positions of the pumping source, the first MUX, the second MUX, and the DEMUX are determined by assuming that forward pumping to the first and second EDFs is performed. However, the positions of the pumping source, the first MUX, the second MUX, and the DEMUX can vary according to the pumping direction of the EDFs.

According to the present invention, complete inversion easily occurs and the noise factor is improved since optical gain required by the front stage becomes smaller by amplifying optical signal in the front-stage amplifier using remnant pumping light separated from the optical signal after it has been amplified in the rear-stage amplifier in the two-stage EDFA. Also, desired output characteristics can be easily obtained since pumping light having high intensity is incident on the rear-stage.

What is claimed is:

1. A two-stage erbium doped fiber amplifier using remnant pumping light, comprising:

a first erbium doped fiber amplifier for generating a first amplified optical signal by amplifying a received optical signal in response to a first pumping light; and a second erbium doped fiber amplifier for generating a second amplifying optical signal and said first pumping light, said second amplified optical signal being generated by amplifying said amplified optical signal in response to a second pumping light, said first pumping light being generated by separating remnant pumping light from said second amplified optical signal, said remnant pumping light being fed back to said first erbium doped fiber amplifier as said first pimping light, said first erbium doped fiber amplifier being amplified by only said first pumping light fed back from said second erbium fiber amplifier.

2. The two-stage erbium doped fiber amplifier as set forth in claim 1, said first erbium doped fiber amplifier comprising:

a wavelength division multiplexer for multiplexing the first pumping light and the received optical signal; and an erbium doped fiber for amplifying the optical signal in response to said first pumping light.

3. The two-stage erbium doped fiber amplifier as set forth in claim 1, said second erbium doped fiber amplifier comprising:

a pumping source for generating said second pumping light;

a wavelength division multiplexer for multiplexing said second pumping light and said amplified optical signal;

an erbium doped fiber for generating said second amplified optical signal by amplifying said amplified optical signal in response to said second pumping light, said second amplified optical signal being multiplexed with remnant pumping light; and a wavelength division demultiplexer for generating said first pumping light by demultiplexing said second amplified optical signal and said remnant pumping light.

4. The two-stage erbium doped fiber amplifier as set forth in claim 2, said second erbium doped fiber amplifier comprising:

a pumping source for generating said second pumping light;

a second wavelength division multiplexer for multiplexing said second pumping light and said amplified optical signal;

a second erbium doped fiber for generating said second amplified optical signal by amplifying said amplified optical signal in response to said second pumping light, said second amplified optical signal being multiplexed with remnant pumping light; and a wavelength division demultiplexer for generating said first pumping light by demultiplexing said second amplified optical signal and said remnant pumping light.

5. The two-stage erbium doped fiber amplifier set forth in claim 1, further comprising an isolator for receiving said second amplified optical signal, said isolator preventing amplified spontaneous emission from being reflected back to said second erbium doped fiber amplifier.

6. The two-stage erbium doped fiber amplifier as set forth in claim 1, further comprising:

a first isolator for providing said received optical signal to said first erbium doped fiber amplifier and for preventing amplified spontaneous emission from being reflected back to a source of said received optical signal; and a second isolator for receiving said second amplified optical signal, said second isolator preventing amplified spontaneous emission from being reflected back to said second erbium doped fiber amplifier.

7. The two-stage erbium doped fiber amplifier as set forth in claim 1, further comprising:

a first isolator positioned between said first erbium doped fiber amplifier and said second erbium doped fiber amplifier for preventing amplified spontaneous emission from being reflected back to said first erbium doped fiber amplifier; and a second isolator for receiving said second amplified optical signal, said second isolator preventing amplified spontaneous emission from being reflected back to said second erbium doped fiber amplifier.

8. The two-stage erbium doped fiber amplifier as set forth in claim 1, further comprising:

a first isolator for providing said received optical signal to said first erbium doped fiber amplifier and for preventing amplified spontaneous emission from being reflected back to a source of said received optical signal;

a second isolator positioned between said first erbium doped fiber amplifier and said second erbium doped fiber amplifier for preventing amplified spontaneous emission from being reflected back to said first erbium doped fiber amplifier; and a third isolator for receiving said second amplified optical signal, said third isolator preventing amplified sponta-neous emission from being reflected back to said second erbium doped fiber amplifier.

9. The two-stage erbium doped fiber amplifier as set forth in claim 1, further comprising:

means for dividing in input optical signal into a first optical signal part and a second optical signal part, said first optical signal part being supplied to said first erbium doped fiber amplifier as said received optical signal;

means for dividing said second amplified optical signal into a first output optical signal part and a second output optical signal part, said first output optical signal part being provided to an output terminal;

a first converter for converting said second optical signal part into a first electrical signal;

a second converter for converting said second output optical signal part into a second electrical signal; and a controller responsive to intensity values represented by said first and second electrical signals for controlling a pumping source of said second pumping light.

10. A method for amplifying an optical signal, said method comprising the steps of:

generating a first amplified optical signal by amplifying a received optical signal in response only to a first pumping light applied to a first erbium doped fiber amplifier; and generating a second amplified optical signal by amplifying said amplified optical signal in response to a second pumping light applied to a second erbium doped fiber amplifier;

separating a remnant pumping light from said second amplified optical signal, said remnant pumping light being fed back to said first erbium doped fiber amplifier as said first pumping light.

11. The method as set forth in claim 10, said step of generating a first amplified optical signal comprising the steps of:

multiplexing the first pumping light and the received optical signal; and passing the multiplexed first pumping light and received optical signal through an erbium doped fiber, said received optical signal being amplified in said erbium doped fiber in response to said first pumping light.

12. The method as set forth in claim 10, said step of generating a second amplified optical signal comprising the steps of:

multiplexing the second pumping light and the first amplified optical signal;

passing the multiplexed second pumping light and first amplified optical signal through an erbium doped fiber, said first amplified optical signal being amplified in said erbium doped fiber in response to said second pumping light.

13. The method as set forth in claim 12, said step of separating comprising demultiplexing, in a wavelength division demultiplexer, said second amplified optical signal to output a demultiplexed second amplified optical signal and said remnant pumping light.

14. The method as set forth in claim 11, said step of generating a second amplified optical signal comprising the steps of:

multiplexing the second pumping light and the first amplified optical signal;

passing the multiplexed second pumping light and first amplified optical signal through a second erbium doped fiber, said first amplified optical signal being amplified in said second erbium doped fiber in response to said second pumping light.

15. The method as set forth in claim 14, said step of separating comprising demultiplexing, in a wavelength division demultiplexer, said second amplified optical signal to output a demultiplexed second amplified optical signal and said remnant pumping light.

16. The method as set forth in claim 10, further comprising the steps of:

dividing in input optical signal into a first optical signal part and a second optical signal part, said first optical signal part being provided as said received optical signal;

dividing, following said separating step, said second amplified optical signal into a first output optical signal pail and a second output optical signal part, said first output optical signal part being provided to an output terminal;

converting said second optical signal part into a first electrical signal;

converting said second output optical signal part into a second electrical signal; and controlling a pumping source of said second pumping light in response to intensity values represented by said first and second electrical signals.

17. A two-stage erbium doped fiber amplifier using remnant pumping light, comprising:

a first erbium doped fiber amplifier stage and a second erbium doped fiber amplifier stage, said second erbium doped fiber amplifier stage amplifying, in response to a second stage pumping light, an optical signal received from said first erbium doped fiber amplifier stage, said second erbium doped fiber amplifier stage outputting an amplified optical signal and a remnant of said second stage pumping light; and said first erbium doped fiber amplifier stage generating said optical signal received by said second erbium doped fiber amplifier stage by amplifying an input optical signal in response to said remnant of said second stage pumping light only.

18. The two-stage erbium doped fiber amplifier as set forth in claim 17, said first erbium doped fiber amplifier stage comprising:

a wavelength division multiplexer for multiplexing said remnant of said second stage pumping light and the input optical signal; and an erbium doped fiber for amplifying the input optical in response to said remnant of said second stage pumping light only.

19. The two-stage erbium doped fiber amplifier as set forth in claim 18, said second erbium doped fiber amplifier stage comprising:

a pumping source for generating said second stage pumping light;

a second wavelength division multiplexer for multplexing said second stage pumping light and said optical signal generated by said first erbium doped fiber amplifier stage;

a second erbium doped fiber generating said amplified optical signal in response to said stage second pumping light; and a wavelength division demultiplexer for separating said remnant of said second stage pumping light from said amplified optical signal, said remnant of said second stage pumping light being fed back to said wavelength division multiplexer of said first erbium doped fiber amplifier stage.

* * * * *